(12) United States Patent
Saaski et al.

(10) Patent No.: US 12,055,466 B1
(45) Date of Patent: Aug. 6, 2024

(54) DEVICES, SYSTEMS AND METHODS RELATING TO HIGH SPEED POSTAL MONITORING

(71) Applicant: Research International, Inc., Monroe, WA (US)

(72) Inventors: Elric Saaski, Monroe, WA (US); Dor Yacobi, Kenmore, WA (US)

(73) Assignee: Research International, Inc., Monroe, WA (US)

( * ) Notice: Subject to any disclaimer, the term of this patent is extended or adjusted under 35 U.S.C. 154(b) by 121 days.

(21) Appl. No.: 18/135,659

(22) Filed: Apr. 17, 2023

(51) Int. Cl.
*G01N 1/24* (2006.01)
*G01N 1/02* (2006.01)
*G01N 21/64* (2006.01)

(52) U.S. Cl.
CPC ............... *G01N 1/24* (2013.01); *G01N 21/64* (2013.01); *G01N 2001/025* (2013.01); *G01N 21/643* (2013.01); *G01N 2021/6497* (2013.01)

(58) Field of Classification Search
CPC ........ G01N 1/24; G01N 21/64; G01N 21/643; G01N 2001/025; G01N 2021/6497
See application file for complete search history.

(56) References Cited

U.S. PATENT DOCUMENTS

| | | | |
|---|---|---|---|
| 10,267,723 B1 * | 4/2019 | Saaski | G01N 15/1404 |
| 2005/0211606 A1 * | 9/2005 | Harshbarger | B26F 1/24 209/552 |
| 2007/0017854 A1 * | 1/2007 | Quine | G01N 23/04 209/552 |
| 2007/0228136 A1 * | 10/2007 | Beckert | A47G 29/1209 232/31 |

* cited by examiner

*Primary Examiner* — David P Porta
*Assistant Examiner* — Meenakshi S Sahu
(74) *Attorney, Agent, or Firm* — King IP Law; Joshua King

(57) ABSTRACT

Systems, devices and methods, etc., that overcome one or more problems associated with high-speed monitoring of large numbers/volumes of postal articles of postal articles for dangerous materials and contaminants. Such monitoring can be more economic, practical, efficient and/or effective. The monitoring systems, methods, etc., herein provide positive pressure clean air passing through an interrogation zone in interrogation zone housing, through which suspect postal articles are pass to provide sampled air, which in turn is analyzed optically to detect dangerous materials such as illicit biologicals or chemicals and to identify the source envelope (or other postal article) to within a few envelopes.

22 Claims, 10 Drawing Sheets

DEVICES, SYSTEMS AND METHODS RELATING TO HIGH SPEED POSTAL MONITORING

BACKGROUND

Postal systems worldwide are becoming increasingly rapid and automated to reduce operating costs and manual handling of mail, thereby improving efficiency and reducing errors. For example, human-labor-intensive processes such as sorting flat pieces (e.g., envelopes, magazines and newspapers) are now being increasingly replaced by high-speed automated systems that read postal article addresses in real-time and deposit them into appropriate out-bins.

An example of such a system is the Tritek 88-5 Mail Sorting Machine manufactured by Tritek Technologies Inc. of Wilmington Delaware, https://tritektech.com/solutions/m-sorter/. The 88-5 series machine can process letter mail efficiently at up to 20,000 per hour, reading addresses on-the-fly and bin sorting. Typically, this type of system will operate at a linear feed rate that may be as high as 2 meters/second.

This modern approach to mail sorting exacerbates and increases the need to effectively and efficiently monitor the mail stream for illicit or dangerous content. One prior approach takes advantage of the fact that postal articles moving through these systems may encourage the discharge of aerosol particles from such postal articles, which aerosol particles can then be analyzed without interfering with or opening the postal articles. One of the first commercially successful systems for doing this, the Biohazard Detection System (BDS), was introduced by the U.S. Postal Service in 2006 for the detection of anthrax spores. It included an air sampling hood placed over the moving stream of mail and a water-based collection tool for capturing and holding the particles for analysis. Collected aerosols were analyzed once each hour using PCR methods to detect the presence of dangerous materials such as anthrax spores. The assay process, including PCR assay, took approximately 90 minutes.

Such prior systems have several drawbacks. For example, the hood can draw in air from the surrounding environment as well as the stream of postal articles, which can lead to false positives, dilution of actual positives and other problems, especially considering that postal handling areas can have quite high background levels of paper dust and other contaminants. Also, since the mail sample is analyzed one-time per hour the dangerous envelope could be one of many thousands processed by the given machine in a given hour. For example, at a linear processing rate of 2 m/s and an average postal article length of 0.25 m, the dangerous envelope would constitute only one item out of about 28,800 articles processed over that hour.

Another problem is that a positive hit would require shutting the line down for an extensive length of time because finding the individual dangerous envelope would be difficult, and the possibility that the dangerous envelope had contaminated personnel and postal equipment would be unacceptably high. PCR testing is also comparatively expensive so the cost of consumables becomes substantial when performed on an hourly basis.

In addition, PCR testing will not detect harmful substances that lack nucleic acids such as drugs of abuse and refined toxic biochemicals such as ricin.

Some incremental improvements have been made to such prior systems, yet the problems above and even problems arising from the incremental improvements continue to exist.

Further, for many homeland security and public health applications, threat situations can be expected to be thinly dispersed over time, but the result of any such isolated threat event could be disastrous and affect many people.

Thus, there is a need for effective, efficient, rapid monitoring of high-speed postal systems and postal articles and the like.

The present systems and methods, etc., provide solutions to one or more of these needs, and/or one or more other advantages.

SUMMARY

The present systems, devices and methods, etc., provide novel approaches that overcome one or more of these problems associated with monitoring of postal articles for dangerous materials and contaminants, especially high-speed monitoring of large numbers/volumes of postal articles. Such monitoring can be more economic, practical, efficient and/or effective.

The novel monitoring systems, methods, etc., herein can detect dangerous materials such as illicit biologicals or chemicals and identify the source envelope (or other postal article) to within a few envelopes, and without requiring expensive consumables such as repetitive PCR.

The present systems, devices and methods, etc., provide high-speed mail monitoring systems, which can be incorporated into high-speed sorting machines. The high-speed mail monitoring systems comprise an interrogation zone to assay for potentially dangerous postal articles. The high-speed mail sorting machine comprises a high-speed postal article transfer system that rapidly transmits the postal articles through a postal article interrogation zone located within an interrogation zone housing, and wherein the interrogation zone housing comprises an input clean air end that receives purified air from an outside source and transmits the input clean air through a sampling zone contained within the interrogation zone housing to provide sampled air that can be in turn transmitted to an optical analysis section comprising an optical analyzer that identifies within less than about 5 seconds potentially dangerous particles from the postal articles via optical scanning.

The postal article interrogation zone and the optical analysis section can both be contained within the interrogation zone housing, and the postal article interrogation zone and the optical analysis section can be contained in different housings. The high-speed mail sorting machine further can comprise an air discharge section that receives the sampled air from the optical analysis section, passes the sampled air through a filter and then ejects purified sampled air to the ambient air. The input clean air can be obtained from an air purifier and blower operably connected to the input clean air end of the postal article interrogation zone. The air purifier can be a HEPA filter. A honeycomb grate can be disposed at the input clean air end of the interrogation zone housing.

The high-speed postal article transfer system can comprise opposed roller sets and cooperating transfer belts for transmitting the postal articles through the interrogation zone.

The interrogation zone housing can have a U-shaped channel through which suspect postal articles and sampling air simultaneously pass. The clean air flow rate entering the interrogation zone housing typically exceeds the sampled air flow rate by at least a ratio of 1.25:1, 1.5:1 or 2:1.

The optical analysis section can comprise an optical emitter configured to emit excitation light to the sampled air having wavelengths of about 350 nm or less and an optical detector to detect fluorescence arising from the excitation light acting on fluorophores in the sampled air, and further can comprise software configured to determine if detected fluorescence exceeds a predetermined threshold level. The optical detector can detect fluorescence arising from the excitation light acting on aerosol fluorophores in the sampled air, including aerosol fluorophores on particles in the sampled air. The optical analysis section can also comprise an optical emitter configured to emit excitation light to the sampled air having wavelengths of about 350 nm or less and also can comprise a dual-channel optical detector configured to separately detect fluorescence arising from the excitation light acting on aerosol fluorophores in the sampled air and scattered light arising from excitation light scattering from aerosol particles in the sampled air, and further can comprise software configured to monitor and examine characteristics of at least one of a detected fluorescence signal and a detected scattered light signal and to make alarm decisions based on a predetermined fluorescence threshold level or a predetermined scattered light threshold level, respectively, or a combined threshold level based on a combination of the detected fluorescence signal and the detected scattered light signal.

Characteristics of the detected fluorescence signal and the detected scattered light signal can be each based on at least one of rate-of-change, detected brightness or integrated photon count. Predetermined threshold levels can be a first predetermined threshold level based on a sampling time of the sampled air of about 0.1-0.5 seconds, which can be a first predetermined alarm threshold level based on a fluorescence or scattering signal rate-of-change measured at about a native sampling rate of the fluorescence or scattering optical detector. Other predetermined threshold levels can be based on the integrated fluorescence or scattering signal measured over a period of time of up to about 5 seconds after the first predetermined alarm event can have occurred. Still other predetermined alarm threshold levels can comprise brightness of a net fluorescence signal above background relative to a net scattering signal above background.

Software in or for the systems herein comprise computer-implemented programming and can be configured such that, if a given predetermined threshold level is exceeded then a second optical sample can be obtained based on a sample time of the sampled air of about 3-5 seconds, and in some embodiments the software then determines if the integrated fluorescence signal and fluorescent brightness of the sample exceed a second predetermined threshold level based on integrated fluorescence signal and fluorescent brightness. In some embodiments, if the second predetermined threshold level has been exceeded then high-speed processing of postal articles is stopped and/or suspect postal articles diverted from the remainder of the postal articles being examined.

The optical scanning can comprise hardware and software to detect chemical identifiers other than fluorescence, and the analysis section can also comprise other desired analysis units such as PCR or other nucleic acid-based analyzers.

These and other aspects, features and embodiments are set forth within this application, including the following Detailed Description and attached drawings. Unless expressly stated otherwise, all embodiments, aspects, features, etc., can be mixed and matched, combined and per- muted in any desired manner. In addition, various references are set forth herein that discuss certain systems, apparatus, methods and other information; all such references are incorporated herein by reference in their entirety and for all their teachings and disclosures, regardless of where the references may appear in this application.

DETAILED DESCRIPTION

Systems, devices and methods, etc., are documented herein that overcome one or more problems associated with high-speed monitoring of large numbers/volumes of postal articles of postal articles for dangerous materials and contaminants. Such monitoring can be more economic, practical, efficient and/or effective. The monitoring systems, methods, etc., herein provide positive pressure clean air passing through an interrogation zone in an interrogation zone housing, through which suspect postal articles are passed to provide sampled air, which in turn is analyzed optically to detect dangerous materials such as illicit biologicals or chemicals and to identify the source envelope (or other postal article) to within a few envelopes.

Figure 1:
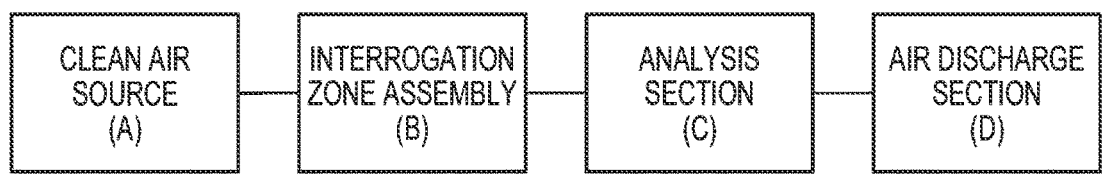
FIG. 1 provides a box diagram of general elements of the systems herein.

FIG. 1 provides a box diagram of general elements of the systems herein. In the embodiment shown, the systems include a clean air source (A) that typically provides particle-free and contaminant-free air to a postal article interrogation zone within a high-speed mail sorting machine, which zone in some embodiments can be considered as a monitored volume. The clean air source (A) can be any suitable source including a pressurized cannister of air or other gas or can intake air from the ambient environment. The clean air is typically substantially particle-free to reduce or avoid false positives or false negatives, for example by passing incoming air through a suitable filter such as a HEPA-style filter (1a), and the air is typically transmitted to a postal article interrogation zone or section (B) using a blower, fan or other suitable system. In the postal article interrogation zone (B), the clean air passes over mail in-process in the high-speed mail sorting machine while the mail is passing through an interrogation zone housing to provide sampled air. The interrogation zone housing can be unitary or an assembly, for example by molding or by connecting different parts using screws, glue, etc. The sampled air is collected and transmitted to a sampled air analysis section (C), and after analysis to an air discharge section (D) where the sampled air is returned to the ambient environment. Such sampled air is typically either passed through a further filter to reduce or avoid the chance of emitting dangerous particles, chemicals, etc., into the environment and/or transmitted for release in a safe location that does not pose dangers to those around the area.

Figure 2:
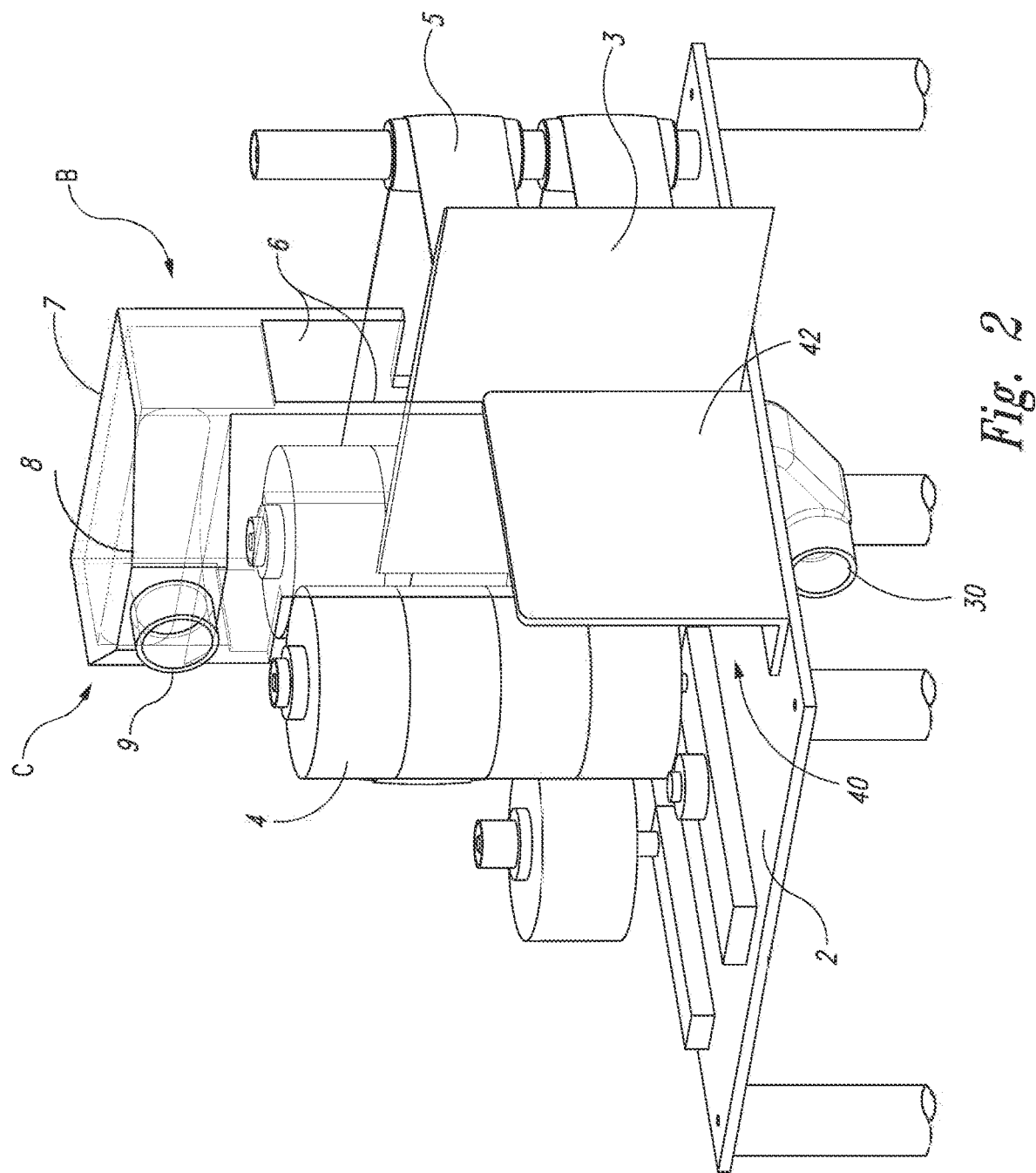
FIG. 2 depicts a perspective top-side cutaway view of a high-speed postal article interrogation zone housing in a high-speed mail sorting machine as discussed herein.
Figure 3:
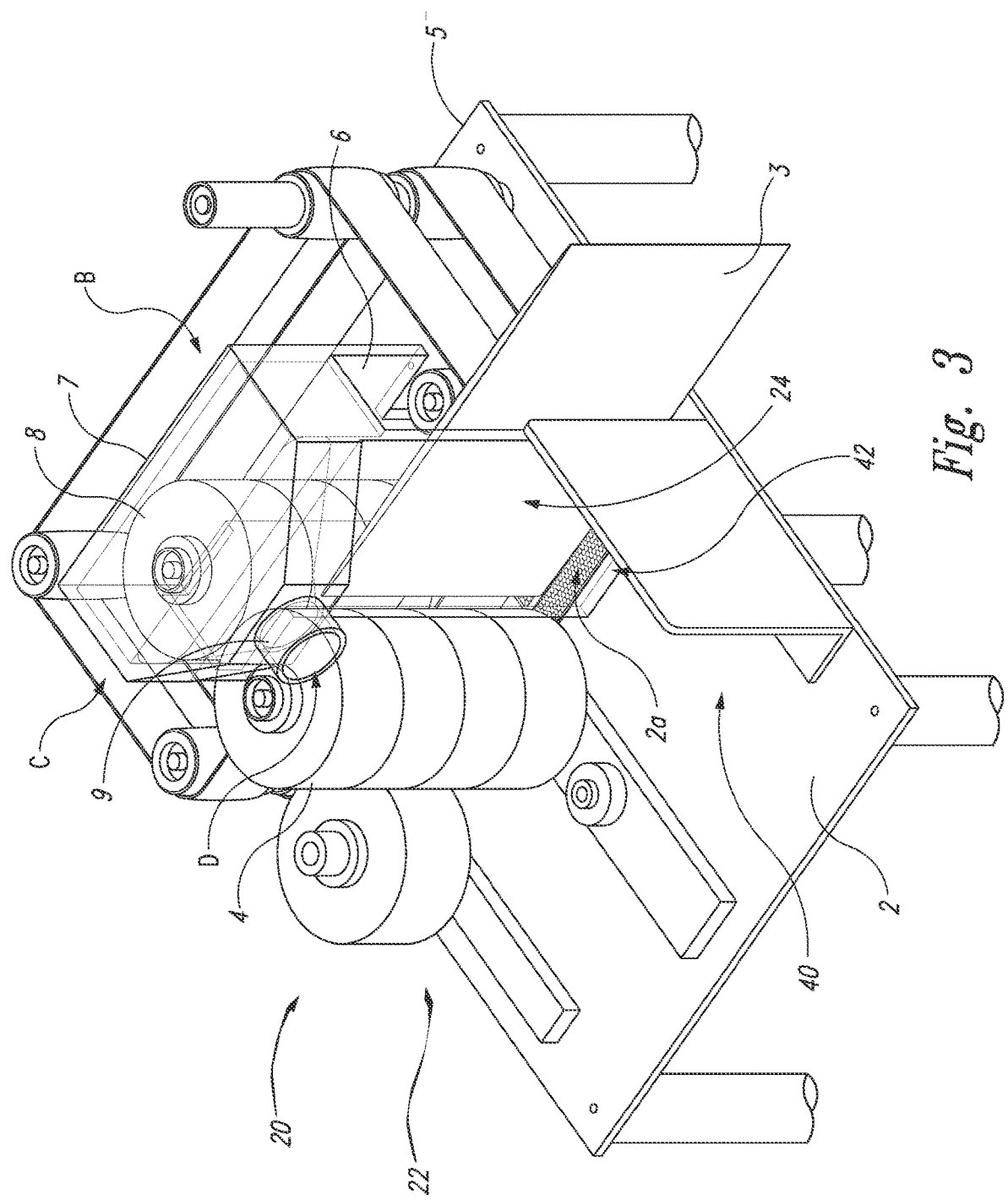
FIG. 3 depicts a perspective top-side cutaway view of a high-speed postal article interrogation zone housing in a high-speed mail sorting machine as discussed herein.

FIGS. 2 and 3 depict perspective top-side cutaway views of a high-speed mail monitoring system 40 incorporated within a high-speed mail sorting machine 20 having a high-speed postal article transfer system 22 and interrogation zone housing 24. In these figures, clean air inlet 30 of clean air source A provides forced clean air through clean air delivery port 42 into interrogation zone housing 24 of postal article interrogation zone B. In this embodiment, the clean air passes through a suitable clean air port that is already present in or created in high-speed mail monitoring system 40 and high-speed mail sorting machine 20, such as honeycomb grate 2a in the figure. The port can be open or can include structure such as honeycomb grate 2a, and/or other features favorably affecting air diffusion, air-direction, air-speed, etc. Such structures provide desired, regulated air flow characteristics.

Figure 4:
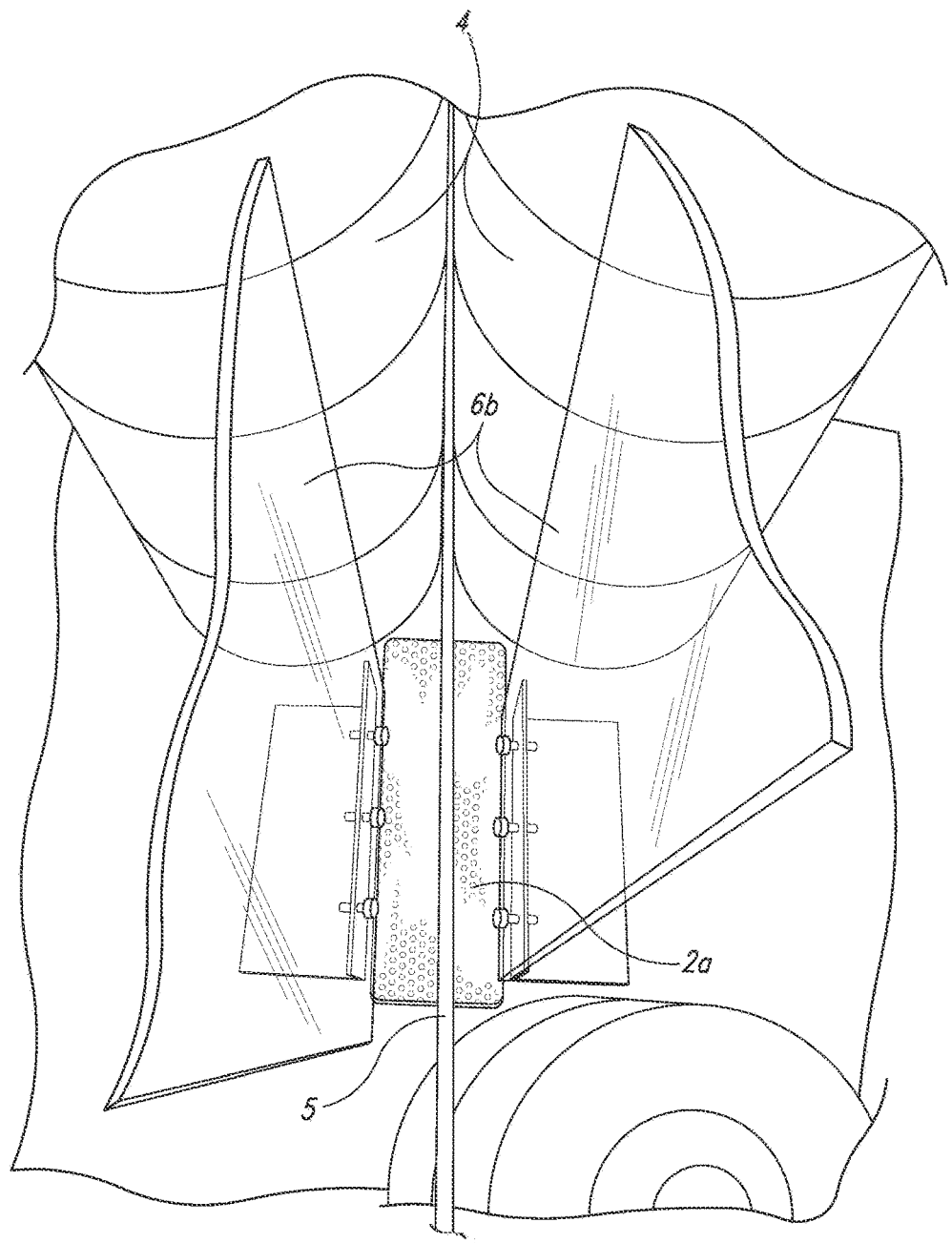
FIG. 4 shows a top-down view of a postal article passing through an interrogation zone housing as discussed herein.
Figure 5:
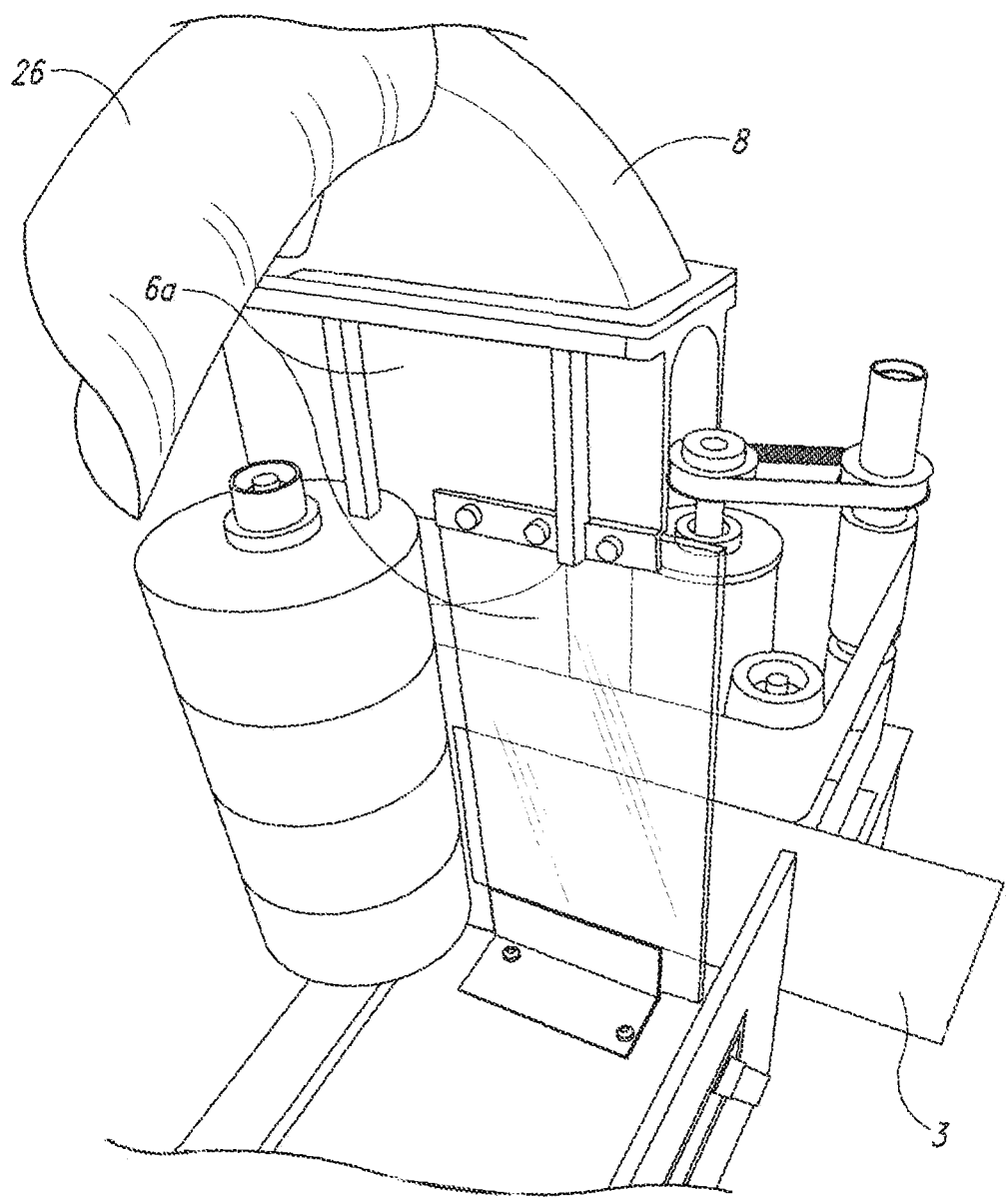
FIG. 5 shows a perspective view of a postal article passing through an interrogation zone housing as discussed herein.

In the embodiment shown, clean air from clean air source A is transferred to a postal article interrogation zone B where it is injected upward through an elongated honeycomb grate 2a in the baseplate 2 of high-speed mail sorting machine 20. The honeycomb grate 2 is positioned so that it injects air approximately equally on both sides of the postal article 3 as the article is transported through interrogation section B by roller set 4 and transfer belt 5 to the next stage of the mail processing line. The honeycomb grate 2a in the Figures has an oriented honeycomb surface on each side of postal article 3's vertical plane such that postal articles 3 are subjected to clean air impingement on both sides of the postal article. FIGS. 4 and 5 show a top-down and perspective views of a postal article 3 passing through the interrogation zone housing 24, demonstrating the verticality of the postal article 3 relative to the airflow.

Figure 8:
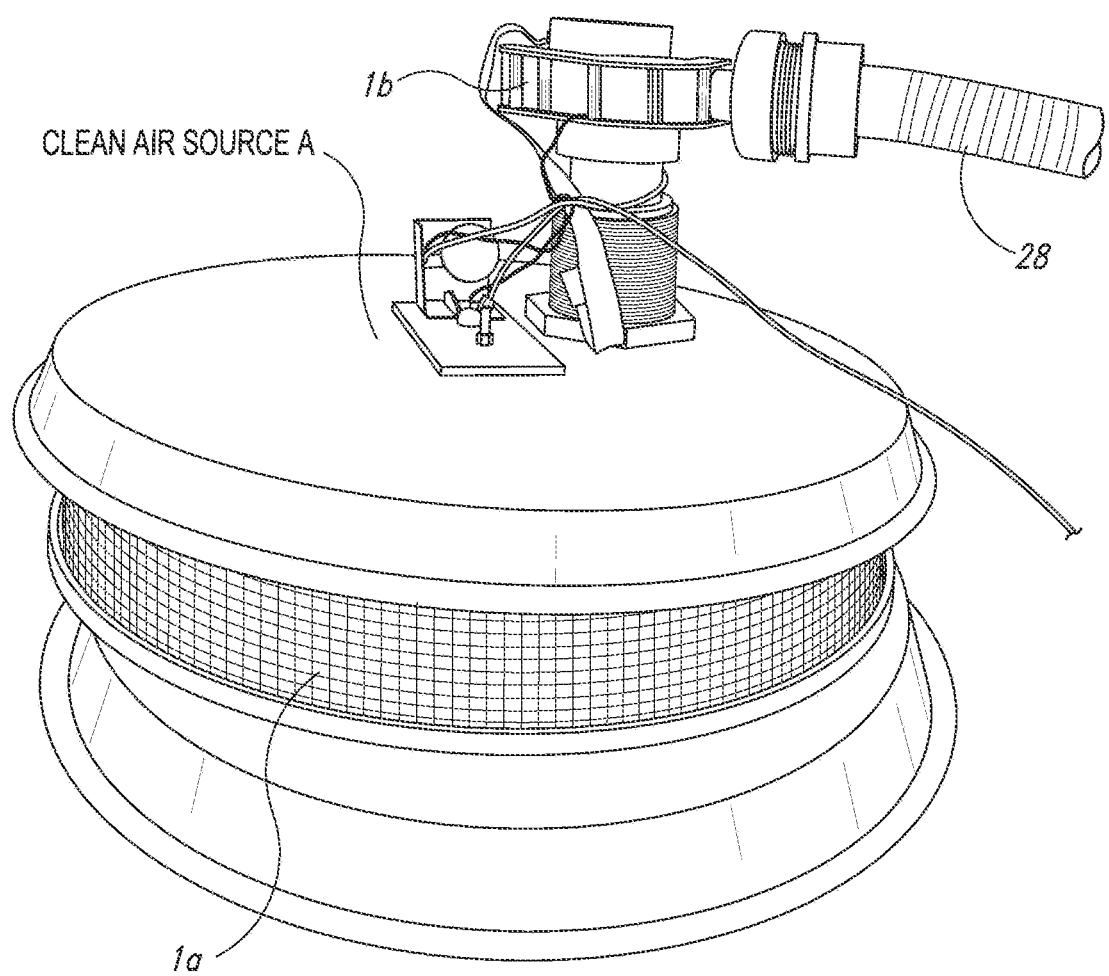
FIG. 8 depicts a side perspective view of an exemplary clean air source A as discussed herein.

An exemplary air source A is shown in FIG. 8, and includes a clean air tube 28 taking air from a clean air HEPA filter 1a to the postal article interrogation zone B. The airflow volume can be selected as desired, one exemplary speed is 400 LPM.

Figure 7:
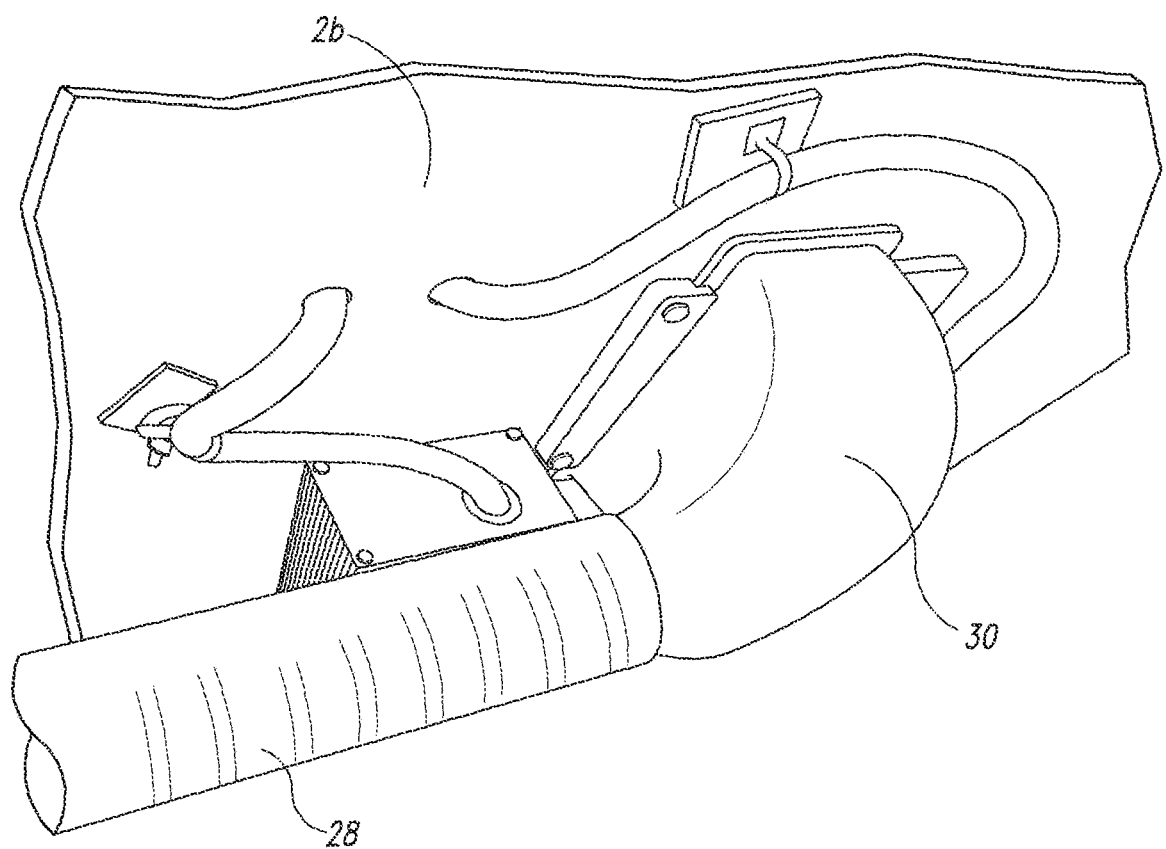
FIG. 7 shows an upward perspective view of bottom face of baseplate of high-speed mail sorting machine including clean air inlet and fresh air honeycomb grate as discussed herein.

FIG. 7 shows an upward perspective view of bottom face 2b (of baseplate 2 of high-speed mail sorting machine 20) including clean air inlet 30 and fresh air honeycomb grate 2a. As in FIG. 7, the clean air inlet 30 and honeycomb grate 2a can have air diffusers, air-deflectors, etc., that control and guide the clean air as it enters postal article interrogation zone B.

Within interrogation zone housing 24, an interrogation volume or sampling zone is created by forcing injected air to flow upward (such injected air can flow downward or other directions as desired) into a downward-facing U-shaped channel 6. In the embodiment shown, U-shaped channel 6 has a minimum width that accommodates both the thickest piece of mail to be processed and the elongated honeycomb grate 2a. The height of channel 6 is typically selected to be taller than the tallest postal article 3 to be processed. The top wall 7 of the U-shaped channel 6 includes an elongated scoop 8 that collects an adequate portion of the sampled air that has moved upward past the postal article 3. By placing the scoop 8 at the top of the channel and introducing air at the bottom, the collection of large paper fragments of no interest is reduced.

Typically, the U-shaped channel 6 is physically attached to the honeycomb grate 2a such as by screws, glue, unitary molding during production, etc. The base of the U-shaped channel 6 is also typically sealed to the baseplate 2 of the high-speed mail sorting machine 20 where possible and extends longitudinally from a point about one postal article in distance in front of the roller set 4 to at least the centerline of roller set 4. Above roller set 4, the side walls of U-shaped channel 6 descend to a suitable clearance distance above roller set 4.

Figure 6:
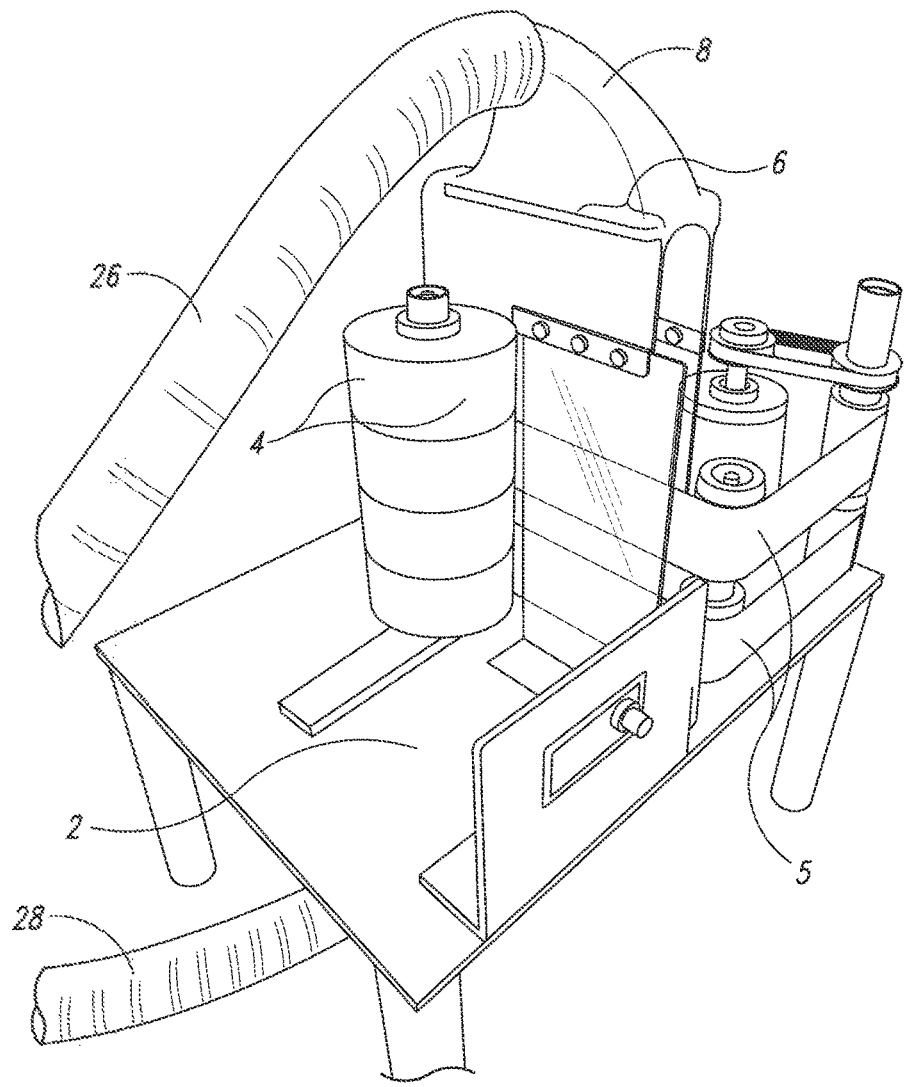
FIG. 6 shows a perspective view of an interrogation zone housing as discussed herein.

Sampled air collected by scoop 8 is collected into a sampled air transfer tube 9. In some embodiments, analysis equipment/analysis section C is incorporated into the interrogation zone housing 24 upstream or immediately attached to sampled air transfer tube 9. In the embodiment shown, the sampled air is transmitted through sampled air transfer tube 9 and then on to an externally located analysis section C, such as sampled air tube 26 in FIG. 6. An exemplary flow rate downstream from the postal article interrogation zone B is 300 LPM. After first being analyzed by a suitable, high-speed analysis machine such as an in-line aerosol particle detector in analysis section C, sampled air is ejected into the local air environment through suitable safety equipment such as a blower and HEPA filter in section D.

Turning to analysis equipment and related methods, the analysis equipment is high-speed such that the time difference between sampling a given postal article and identification that there might be or is something dangerous about that given postal article is minimized so that only a few postal articles have a chance to pass through the high speed postal article transfer system 22 and interrogation zone housing 24 before an alarm is raised. This is advantageous to reduce the amount of downtime of the overall system and to make identifying specific suspect postal articles easier and faster. One suitable analyzer for analysis section C is Research International's Tac-7C, https://www.resrchintl-.com/Tac-7.html, shown as analyzer 34 in FIG. 9. In some embodiments, such analyzer can include software specific to the high-speed mail monitoring systems herein, including the algorithms specific to the current systems discussed hereinbelow.

Figure 9:
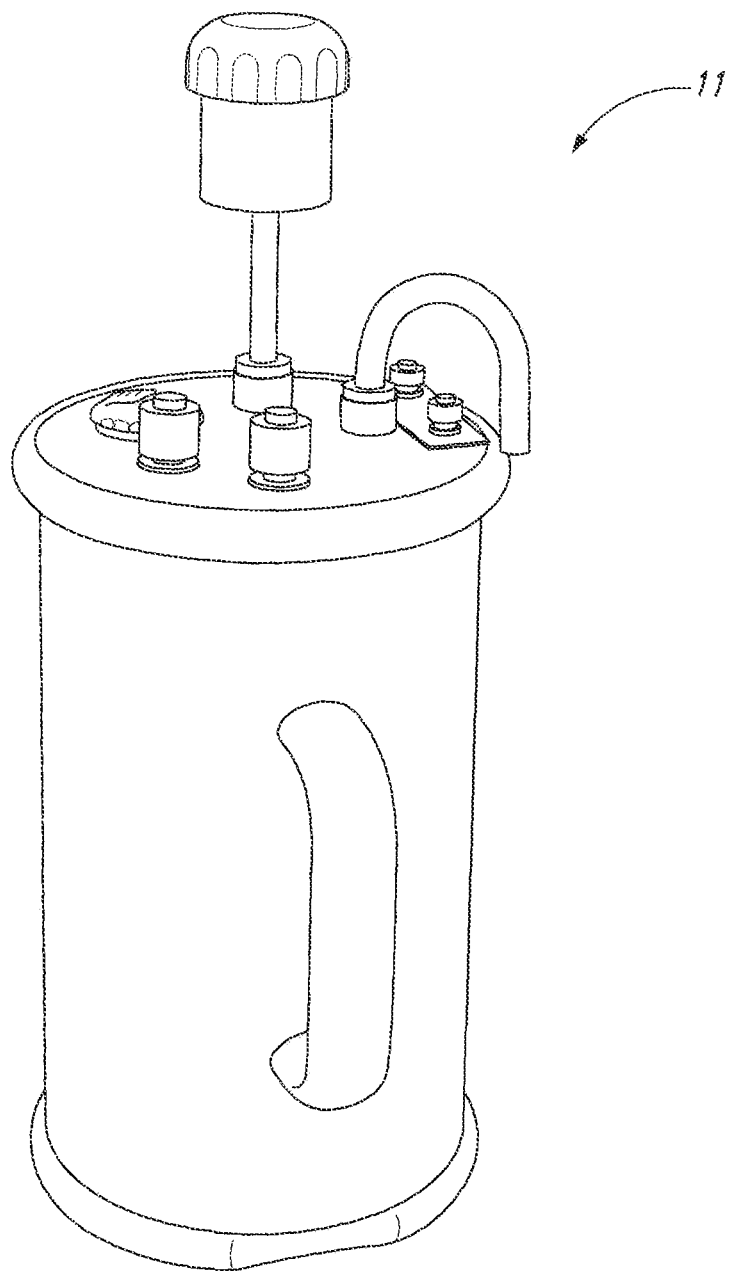
FIG. 9 depicts a suitable analyzer for analysis section C, namely Research International's Tac-7C, https://www.resrchintl.com/Tac-7.html.

A conventional aerosol particle sizing instrument is less desired for analysis in section C because the aerosol interrogation process in interrogation zone housing 24 may also collect an undesired amount of innocuous particles such as dust and paper chaff. A UV fluorescence-based detector such as in FIG. 9 is suitable, typically where it can distinguish threat aerosols from common background aerosols by detecting UV-stimulated fluorescence, which can be autofluorescence, created by fluorophores in biological materials that would normally not be present in postal articles nor safe materials. Such fluorophores can include aerosol fluorophores, namely fluorophores physically found within or on aerosols in the sampled air.

In certain embodiments, the UV fluorescence-based aerosol detector is selected such that the excitation wavelength is short enough to avoid causing and/or detecting innocuous fluorophores such can be found in certain commercial paper products that incorporate whiteners that are excited by blue or long wavelength UV light. In applicant's experience, the systems, methods, etc., herein were improved when fluorescence-based detectors having excitation wavelengths less than 400 nm, 350 nm or 300 nm or less are incorporated.

Particularly for excitation wavelengths less than about 300 nm, fluorescence from whiteners and the like were significantly suppressed while signals from toxins such as ricin, biological compounds such tryptophan, and drugs such as MDMA were significantly enhanced: For such short-wave UV-C based instruments, there can be significant responses from many illicit drugs. The systems and methods, etc., herein can be useful for both counterterrorism applications and illicit drug interception.

Laboratory studies of the systems herein that include high-speed mail sorting machines having interrogation zone housing, etc., as discussed herein using a UV-C detector (wavelengths between 200-280 nm.) revealed unexpectedly short but intense aerosol events: captured aerosols from envelopes doped with simulants passed through the UV-C detector within a total period of about 10 seconds, 5 seconds, 3 seconds or less and peak aerosol concentrations occurred typically within 1 second of the envelope's passage.

It was further discovered that it was unnecessary to capture the signature of individual suspect particles. In a typical fluorescence-based detector having UV-C ability, such as Research International's Tac-7C, each particle passing through the UV-C interrogation beam is characterized by size and the number of photons of fluorescence light and the number of photons of scattered light. This is useful for excluding non-threatening aerosol interferents that have a low fluorescence count compared to a strong scattering photon count. This ratio of net fluorescence photons to net scattering photons is termed particle brightness.

It was found that when simulants and interferent particles were loaded into postal articles and passed through the interrogation zone housing herein, particle sizing was not needed: particle brightness based on the ratio of time-based total net fluorescence and total net scattering, which can be total net fluorescence and total net scattering, produced essentially the same brightness information. The reduced computations and if desired firmware streamlining unexpectedly reduced the reporting period from about 15 seconds to about ¼ second. Thus, the lag time between a suspect envelope passing through the interrogation volume and it being detected was significantly reduced.

Figure 10:
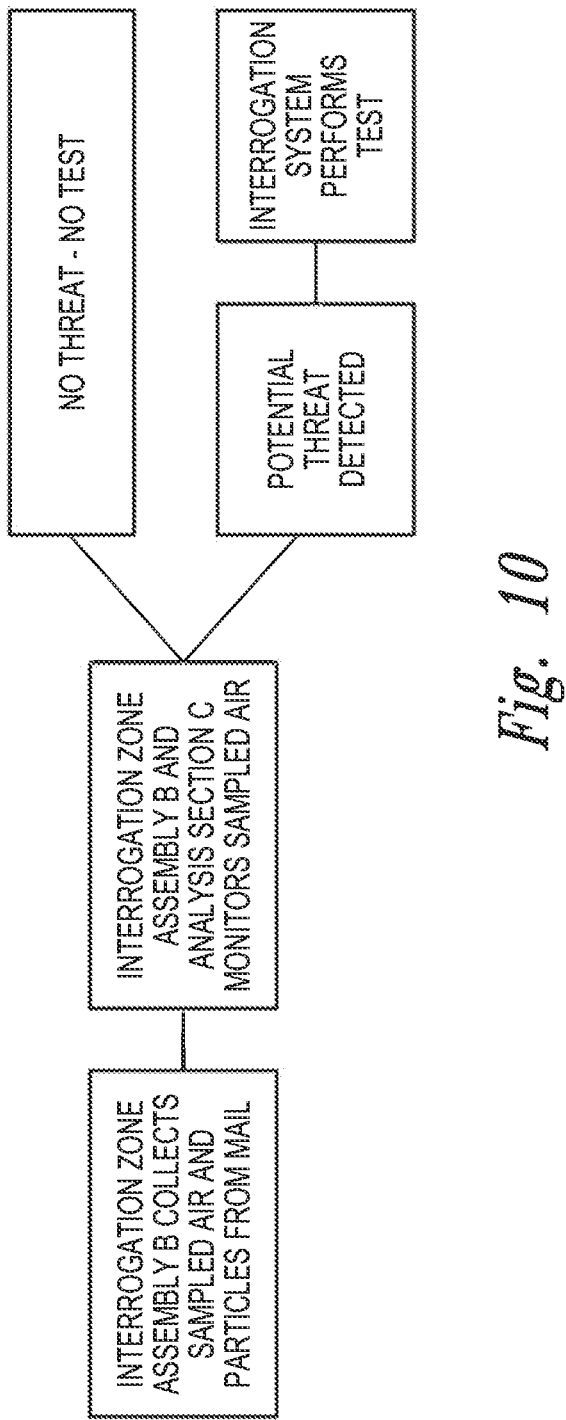
FIG. 10 depicts a flow chart of exemplary optical detection methods as discussed herein.

In some embodiments, the systems, methods, etc., herein take advantage of the high-speed capability of light-based analyzers yet reduce the number of false positives, via an algorithm that provides a two-level alarm strategy comprising an early warning step followed by a confirmation step. FIG. 10 provides a flow chart for this approach.

In one approach, the first-level warning is based on an analysis of the latest data point's fluorescence photon count, for example within limits of the given system's analyzer data rate or within the latest 0.10 second, 0.25 second or 0.50 second of the suspect data point, compared to a selected number of previous photon counts, for example the previous two, three, four or five previous data points recorded in the analyzer. If there is a rate-of-change in the fluorescence signal counts that exceeds a preset alarm limit, then a level-1 alarm signal is sent, typically immediately, to the mail processing equipment that allows the subject envelope and its nearest neighbors to be either identified electronically or physically marked. The alarm limit is typically set to be at least two to three standard deviations above the rate-of-change noise floor associated with the postal article inspection process. Under a level-1 alarm state the process stream is allowed to continue. The time interval and number of data points can be selected as desired, for example depending on the target(s) to be detected or the particular analyzer(s) in use. By way of nonlimiting example, the Tac-7C with high-speed software installed has a sampling interval of 0.25 seconds.

The level-1 alarm immediately triggers a level-2 alarm process wherein the fluorescent and scattering photon counts are integrated over a longer interval, typically a 3-5 second period although other periods can be used such as 20 seconds, 10, seconds or 2 seconds. If the total fluorescent counts and brightness both exceed alarm 2 thresholds then a confirmation signal is sent that identifies this as a likely threat situation and the line is stopped and/or the potentially dangerous postal articles are removed from the processing line. The brightness and photon count alarm levels are typically set to be two to three standard deviations above background levels of total fluorescence counts and aerosol brightness. All alarm variable background levels may be selected based on processing hardware and postal article specifics, and the background levels can be empirically determined for a given mail handling system by performing processing tests or analyzing past data.

In some embodiments, a suspect envelope's passage can be detected with level-1 detection within 1 second of its exit from the interrogation zone housing. At a system feed rate of 2 msec, only about 8 envelopes will have passed in that one second.

Turning to some further embodiments for the system itself, the components thereof can be selected by a skilled person in view of the discussions herein. For example, clean air source A and air discharge section D can be constructed with any suitable air purifier that removes target particles, chemicals, etc. HEPA filters and blowers are typically capable of providing the requisite air flows.

To minimize the ingress of dirty outside air into the sampled air, the clean air in-flow rate can be selected to exceed the sampled air flow rate. This creates a positive pressure that helps keep unwanted materials out of the interrogation and analysis zones. In general, clean air flow rate can be chosen to exceed the sampled air flow by a ratio of 1.25:1 to 1.5:1. In one embodiment, clean air and sampled air flow rates are 400 liters/min and 300 liters/min, respectively. Some external air will be drawn into the interrogation volume by the postal articles themselves, but the amount is usually not significant. If there is concern that the clean air flow will expel threat agents into the work space surrounding the interrogation volume, additional air collection ducts can be installed on the leading and trailing edges of the interrogation zone housing, such as at the collection scoop, and then such air streams can be directly injected into the air discharge section D.

The elongated grate or other air input port may be constructed of any suitable material with linear straight-through holes, such as a metal honeycomb and typically incorporates a hardened ceramic or metal center strip lengthwise that prevents the grate from wearing down due to postal articles rubbing on its surface. A suitable width for the center strip is ½ the width of the thickest postal article, and the overall width of the perforated grate is greater than the thickest postal article to be scanned, for example greater than the width of such thickest postal article. The axial length of the grate can be selected to be about 0.5 to 1.5 times the length of the articles being examined A non-limiting example of an axial length may be in the range of 15-20 cm.

To provide a uniform exit flow of air through the grate from end-to-end and side-to-side along the grate, the grate can be selected to have a measurable pressure drop of around 2.5 mm of water or more to balance the flow so that any flow nonuniformity associated with the air supply tubing transitioning to the grate is minimized. If desired, internal vanes within the clean air inlet below the grate may be used to further direct and make the clean air flow uniform, and circular through-holes of 2.5 mm diameter may be slanted at an angle of 2 to 5 degrees from vertical to form jets of air that impinge on the postal article and more thoroughly interrogate its surfaces.

The interior width of the U-shaped channel can be selected to be about 25 mm greater than the width of the thickest postal article to be scanned. To ensure that the system has a strong level-1 alarm response, the average clean air velocity can be selected such that the clean air traverses the height of the tallest target postal article over a length of time not exceeding 5% of the article's residence time within the interrogation volume. As a non-limiting example, if the article is 0.25 m in length and the processing velocity is 2 m/sec, then clean air should reach the top of the article in less than 0.025 second.

As discussed previously, the base of the U-shaped channel can be selected to be sealed to the baseplate of the high-speed mail sorting machine and extend longitudinally from a point about one postal article in distance away from the roller set of the high-speed mail sorting machine to at least the centerline of the roller set. Above the roller set, the side walls of channel can be selected to descend to within a minimal clearance distance of roller set, such as 1 to 2 mm.

The exit scoop length can be selected to not exceed the length of the grate or other inlet structure, for example to be 10 to 15 cm in length and 25 mm in width. The scoop can be placed directly in front of the roller set. The air outlet scoop can be configured to penetrate on the top surface of the U-Shaped channel or the channel height may be increased and the scoop installed in substantially the same location but on the side wall near the top of channel, or otherwise as desired.

In some embodiments, to maintain a sharp concentration leading edge, the tubing between the scoop and the detector/analyzer can be minimized, for example less than 1.5 m and of a diameter less than 32 mm One suitable detector is Research International's Tac-7 biodetector with high-speed postal monitoring software according to the discussion herein. In one embodiment, aerosol samples may be taken from the 300 liter/min sampled flow by any suitable pickoff method or system used for sampling from aerosol pipe flows. Other types of assays can also be used with the systems, etc., herein, including other light-based assays. In addition, slower identifying assays can also be incorporated, for example to identify specific threats such as ricin or anthrax after the high-speed detection has detected a possible threat.

In some embodiments it may also be desirable to separately and/or in parallel use the particle detector's optical scattering signal by itself to warn of the presence of other potentially dangerous aerosol emissions. As previously discussed, the scattering signal can be used in combination with the fluorescence signal to determine aerosol particle brightness: Many organisms and toxins share molecular building blocks that fluoresce brightly when irradiated with light of less than 400 nm, 350 nm or 300 nm wavelength. However, a sudden change in the non-fluorescent particle background may also signal the presence of non-fluorescing but important targets such as fentanyl and its derivatives.

The systems, methods, devices, assemblies, etc., herein are capable of rapidly detecting certain target classes of illicit drugs, but in certain embodiments do not provide specific chemical composition identification. Detectors designed to determine specific chemical composition typically do not respond as quickly as the fluorescence-based systems herein discussed, for example many chemical identifiers have 20 to 60 second response times. The identification speed, whether specific or non-specific for a given chemical identifier, for chemical detectors for high-speed postal processing as well as for other applications can be improved by combining the chemical detector with a fluorescence-based system as herein. Such information can be stand-alone or complementary when used in conjunction with the fluorescent-based functions herein. Suitable chemical detectors for postal processing applications are known and include the mass spectrometer MX908 manufactured by 908 Devices of Boston, MA. However, such a detector typically requires 60-70 seconds to identify chemical aerosols. For this reason, if it is used as a stand-alone device, the location of a target postal article in the mail stream may only be known as being within a group of about 500 postal articles processed by a mail sorting system operating at 2 msec, which is a significant detriment to its use compared to near-instantaneous optical-interrogation-based systems such as the fluorescence-based systems herein.

Aerosols released by the threat-containing postal article can be detected as a scattering signal anomaly by the systems, methods, etc., herein within a few seconds, essentially pinpointing the point in time the article of interest passed through the processing system. In some embodiments, the fluorescence-based systems herein can be used to trigger a chemical detector or identifier to perform a chemical assay. Many chemical threats such as fentanyl derivatives and high explosives have very low vapor pressures and a preliminary step prior to vapor analysis can include a lengthy volatilization of previously captured aerosol particles. Combining a traditional chemical detector with a system as herein discussed captures a larger range of possible threats and may also lengthen the chemical detector's functional lifetime because, for example, mass spectrometers require high vacuum pumps that often have limited operating lives, and it can be possible to reduce or eliminate their continuous operation by combining with or including them in the systems, etc., herein.

For the purpose of aerosol monitoring based on scattered light, the scattering signal rate-of-change can provide a first alarm criteria, while the integrated scattering light signal provides a confirmatory second alarm criteria. A plurality of different alarm criteria can be used as desired, for example, 3, 4, 5 or more alarm criteria can be used as desired.

Optically-read immunoassays and chromatographic methods may be enhanced in several ways by the systems, methods, etc., herein. By way of nonlimiting example, various fluorescent markers or media may be used in combination with spectrally-selected illumination, such as ultraviolet illumination, to enhance or quench background, analyte or reporter molecule fluorescence so as to increase contrast and improve detection limits for targeted analytes.

Methods herein include methods of making the devices, systems, assemblies, etc., herein, as well as methods of using such devices and systems. Exemplary methods include obtaining a scan or other measurement of sampled air and/or a target postal article by passing such article through the interrogation zone and passing clean air over the article, typically on both sides of the article as discussed herein, then optically interrogating the sampled air via fluorescence, scattered light, etc., and then detecting and analyzing the resulting emissions and determining therefrom if one or more thresholds, alarms, etc., have been met. The process can be repeated for a second wavelength band and second color, then for a third wavelength band and color, as desired. The first and second selected colors can be substantially the same as the desired wavelength band for each of the desired wavelength bands. The methods further can comprise detecting the intensity of light emanating from the illuminated target aerosol via a substantially monochromatic sensor, and otherwise making, using and implementing the devices and systems herein.

All terms used herein are used in accordance with their ordinary meanings unless the context or definition clearly indicates otherwise. Also, unless expressly indicated otherwise, in the specification the use of "or" includes "and" and vice-versa. Non-limiting terms are not to be construed as limiting unless expressly stated, or the context clearly indicates, otherwise for example, "including," "having," and "comprising" typically indicate "including without limitation". Singular forms, including in the claims, such as "a," "an," and "the" include the plural reference unless expressly stated, or the context clearly indicates, otherwise.

Unless otherwise stated, adjectives herein such as "substantially" and "about" that modify a condition or relationship characteristic of a feature or features of an embodiment, indicate that the condition or characteristic is defined to within tolerances that are acceptable for operation of the embodiment for an application for which it is intended.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims or other claim having adequate support in the discussion and figures herein.

What is claimed is:

1. A high-speed mail sorting machine having an interrogation zone to assay for potentially dangerous postal articles, wherein the high-speed mail sorting machine comprises a high-speed postal article transfer system that rapidly transmits the postal articles through a postal article interrogation zone located within an interrogation zone housing, and wherein the interrogation zone housing comprises an input clean air end that receives purified air from an outside source and transmits the input clean air through a sampling zone contained within the interrogation zone housing to provide sampled air that is in turn transmitted to an optical analysis section that identifies within less than about 5 seconds potentially dangerous particles from the postal articles via optical scanning.

2. The high-speed mail sorting machine of claim 1 wherein the postal article interrogation zone and the optical analysis section are both contained within the interrogation zone housing.

3. The high-speed mail sorting machine of claim 1 wherein the postal article interrogation zone and the optical analysis section are contained in different housings.

4. The high-speed mail sorting machine of claim 1 wherein the high-speed mail sorting machine further comprises an air discharge section that receives the sampled air from the optical analysis section, passes the sampled air through a filter and then ejects purified sampled air to the ambient air.

5. The high-speed mail sorting machine of claim 1 wherein input clean air is obtained from an air purifier and blower operably connected to the input clean air end of the postal article interrogation zone.

6. The high-speed mail sorting machine of claim 1 wherein the air purifier is a HEPA filter.

7. The high-speed mail sorting machine of claim 1 wherein a honeycomb grate is disposed at the input clean air end of the interrogation zone housing.

8. The high-speed mail sorting machine of claim 1 wherein the high-speed postal article transfer system comprises opposed roller sets and cooperating transfer belts for transmitting the postal articles through the interrogation zone.

9. The high-speed mail sorting machine of claim 1 wherein the interrogation zone housing has a U-shaped channel through which suspect postal articles and sampling air simultaneously pass.

10. The high-speed mail sorting machine of claim 1 wherein a clean air flow rate entering the interrogation zone housing exceeds sampled air flow rate by at least a ratio of 1.25:1.

11. The high-speed mail sorting machine of claim 1 wherein a clean air flow rate entering the interrogation zone housing exceeds sampled air flow rate by at least a ratio of 1.5:1.

12. The high-speed mail sorting machine of claim 1 wherein the optical analysis section comprises an optical emitter configured to emit excitation light to the sampled air having wavelengths of about 350 nm or less and an optical detector to detect fluorescence arising from the excitation light acting on fluorophores in the sampled air, and further comprises software configured to determine if detected fluorescence exceeds a predetermined threshold level.

13. The high-speed mail sorting machine of claim 12 wherein the optical detector detects fluorescence arising from the excitation light acting on aerosol fluorophores in the sampled air.

14. The high-speed mail sorting machine of claim 1 wherein the optical analysis section comprises an optical emitter configured to emit excitation light to the sampled air having wavelengths of about 350 nm or less and also comprises a dual-channel optical detector configured to separately detect fluorescence arising from the excitation light acting on aerosol fluorophores in the sampled air and scattered light arising from excitation light scattering from aerosol particles in the sampled air, and further comprises software configured to monitor and examine characteristics of at least one of a detected fluorescence signal and a detected scattered light signal and to make alarm decisions based on a predetermined fluorescence threshold level or a predetermined scattered light threshold level, respectively, or a combined threshold level based on a combination of the detected fluorescence signal and the detected scattered light signal.

15. The high-speed mail sorting machine of claim 14 wherein characteristics of the detected fluorescence signal and the detected scattered light signal are each based on at least one of rate-of-change, detected brightness or integrated photon count.

16. The high-speed mail sorting machine of claim 12 wherein the predetermined threshold level is a first predetermined threshold level based on a sampling time of the sampled air of about 0.1-0.5 seconds.

17. The high-speed mail sorting machine of claim 12 wherein a first predetermined alarm threshold level is based on a fluorescence or scattering signal rate-of-change measured at about a native sampling rate of the fluorescence or scattering optical detector.

18. The high-speed mail sorting machine of claim 17 wherein a second predetermined threshold level is based on the integrated fluorescence or scattering signal measured over a period of time of up to about 5 seconds after the first predetermined alarm event has occurred.

19. The high-speed mail sorting machine of claim 17 wherein a second predetermined alarm threshold level is based on brightness of a net fluorescence signal above background relative to a net scattering signal above background.

20. The high-speed mail sorting machine of claim 16 wherein the software is configured such that, if the first predetermined threshold level is exceeded then a second optical sample is obtained based on a sample time of the sampled air of about 3-5 seconds, and the software then determines if the integrated fluorescence signal and fluorescent brightness of the sample exceed a second predetermined threshold level based on integrated fluorescence signal and fluorescent brightness.

21. The high-speed mail sorting machine of claim 20 wherein, if the second predetermined threshold level has been exceeded then high-speed processing of postal articles is stopped and/or suspect postal articles are diverted from the remainder of the postal articles being examined.

22. The high-speed mail sorting machine of claim 1 wherein the optical scanning comprises hardware and software to detect chemical identifiers other than fluorescence.

* * * * *